United States Patent
Jin et al.

(10) Patent No.: US 9,106,770 B2
(45) Date of Patent: Aug. 11, 2015

(54) COLUMN DRIVERS WITH EMBEDDED HIGH-SPEED VIDEO INTERFACE TIMING CONTROLLER

(75) Inventors: Xin Jin, San Jose, CA (US); Zhengyu Yuan, Cupertino, CA (US); Ming Qu, San Jose, CA (US)

(73) Assignee: Parade Technologies, Ltd., George Town, Grand Cayman (KY)

( * ) Notice: Subject to any disclaimer, the term of this patent is extended or adjusted under 35 U.S.C. 154(b) by 549 days.

(21) Appl. No.: 13/165,749

(22) Filed: Jun. 21, 2011

(65) Prior Publication Data

US 2012/0327047 A1 Dec. 27, 2012

(51) Int. Cl.
*G09G 5/00* (2006.01)
*H04N 5/00* (2011.01)
*G09G 3/20* (2006.01)

(52) U.S. Cl.
CPC .. *H04N 5/00* (2013.01); *G09G 3/20* (2013.01); *G09G 5/006* (2013.01); *G09G 2310/027* (2013.01); *G09G 2310/0221* (2013.01); *G09G 2310/0281* (2013.01); *G09G 2330/02* (2013.01); *G09G 2330/028* (2013.01); *G09G 2370/04* (2013.01); *G09G 2370/08* (2013.01); *G09G 2370/10* (2013.01)

(58) Field of Classification Search
CPC ....................................................... G06F 3/038
USPC ........... 345/204, 530, 1.2; 370/433, 437, 216, 370/225, 241.1, 242, 252, 333, 338, 401; 455/41.2, 519
See application file for complete search history.

(56) References Cited

U.S. PATENT DOCUMENTS

| | | | |
|---|---|---|---|
| 6,300,928 B1 | 10/2001 | Kim | |
| 2004/0221056 A1* | 11/2004 | Kobayashi | 709/232 |
| 2004/0233181 A1 | 11/2004 | Kobayashi | |
| 2005/0062699 A1* | 3/2005 | Kobayashi | 345/87 |
| 2005/0062711 A1* | 3/2005 | Kobayashi | 345/100 |
| 2005/0066085 A1* | 3/2005 | Kobayashi | 710/62 |
| 2009/0244052 A1* | 10/2009 | Takahashi | 345/213 |

(Continued)

FOREIGN PATENT DOCUMENTS

| | | |
|---|---|---|
| JP | 2007-193305 A | 8/2007 |
| KR | 10-0937509 B1 | 1/2010 |

(Continued)

OTHER PUBLICATIONS

Korean Office Action, Korean Application No. 10-2012-0065984, Oct. 22, 2013, 8 pages.

(Continued)

*Primary Examiner* — Olga Merkoulova
(74) *Attorney, Agent, or Firm* — Fenwick & West LLP

(57) ABSTRACT

A system and method are disclosed for embedding a timing controller on column drivers which, among other advantages, reduces power consumption and size constraints. A standalone timing controller is eliminated by splitting a video input signal and delivering the signal to each of the column drivers. Timing controller functionality is embedded in each of the column drivers to allow the column drivers to process the received video signal. An auxiliary input used for communication between column drivers and an external system is received by a master column driver. The master column driver communicates with slave column drivers to enable point to point communication between each column driver and the external system.

24 Claims, 4 Drawing Sheets

(56) References Cited

U.S. PATENT DOCUMENTS

| | | |
|---|---|---|
| 2010/0225637 A1 | 9/2010 | Jeon et al. |
| 2010/0289945 A1 | 11/2010 | Kobayashi et al. |
| 2011/0157103 A1* | 6/2011 | Chen et al. .................... 345/204 |
| 2012/0056870 A1* | 3/2012 | Koh .............................. 345/215 |

FOREIGN PATENT DOCUMENTS

| | | |
|---|---|---|
| TW | 200729122 A | 8/2007 |
| TW | 201040911 A1 | 11/2010 |
| TW | 201102990 A1 | 1/2011 |
| WO | WO 2010/131843 A2 * | 11/2010 ............... G09G 3/20 |

OTHER PUBLICATIONS

Korean Office Action, Korean Application No. 10-2012-0065984, Jul. 24, 2014, 15 pages.

Taiwan Office Action, Taiwan Application No. 101122275, Mar. 21, 2014, 12 pages.

* cited by examiner

COLUMN DRIVERS WITH EMBEDDED HIGH-SPEED VIDEO INTERFACE TIMING CONTROLLER

BACKGROUND

1. Field of Art

The disclosure generally relates to an intra-panel interface of a display device. More specifically, the disclosure relates to a column driver with an embedded DISPLAYPORT timing controller and its system implementation.

2. Description of the Related Art

A typical pixel based display includes several column drivers. Each of the column drivers drives a group of pixels, often hundreds in the form of a column. The column drivers are able to drive any individual pixel through an output buffer circuit. A timing controller (TCON) is used to control the column drivers and display a desired image. The TCON processes communications received over a video link and transmits data to individual column drivers, but the interface between the TCON and column drivers can consume significant energy. Operation of a standalone TCON and related transmission functions typically accounts for a significant amount of power draw. A standalone TCON can also increase the size and cost of hardware used in the manufacturing of a display panel by using a chip separate from any of the column drivers.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Various embodiments provide a system and method for embedding TCONs in the column drivers of a display. The disclosed system and method can decrease the power consumption and space used in display hardware. In an example embodiment, TCON functionality is embedded in each of the column drivers of a system. DISPLAYPORT is a high speed point to point interface protocol. The disclosed system embeds TCON functionality into each of the column drivers in a system while maintaining point to point capabilities to comply with the DISPLAYPORT specification. The timing controller processes video input and coordinates column drivers in a display to produce a desired image. In one embodiment, by embedding TCON functionality into the column drivers, chip real estate used in a display can be reduced. In addition, an interface such as reduced swing differential signaling (RSDS) can consume a significant amount of power transmitting signals from the standalone TCON, which is conventionally used rather than a power divider. This interface is eliminated by embedding the TCON on the column drivers. Although generally described for use in conjunction with DISPLAYPORT, systems utilizing other video standards including HDMI and DVI can benefit from the disclosed system and method. In addition to DISPLAYPORT, the disclosed system and method can be similarly utilized with EMBEDDED DISPLAYPORT for connections including those within a display panel interface.

Figure 1:
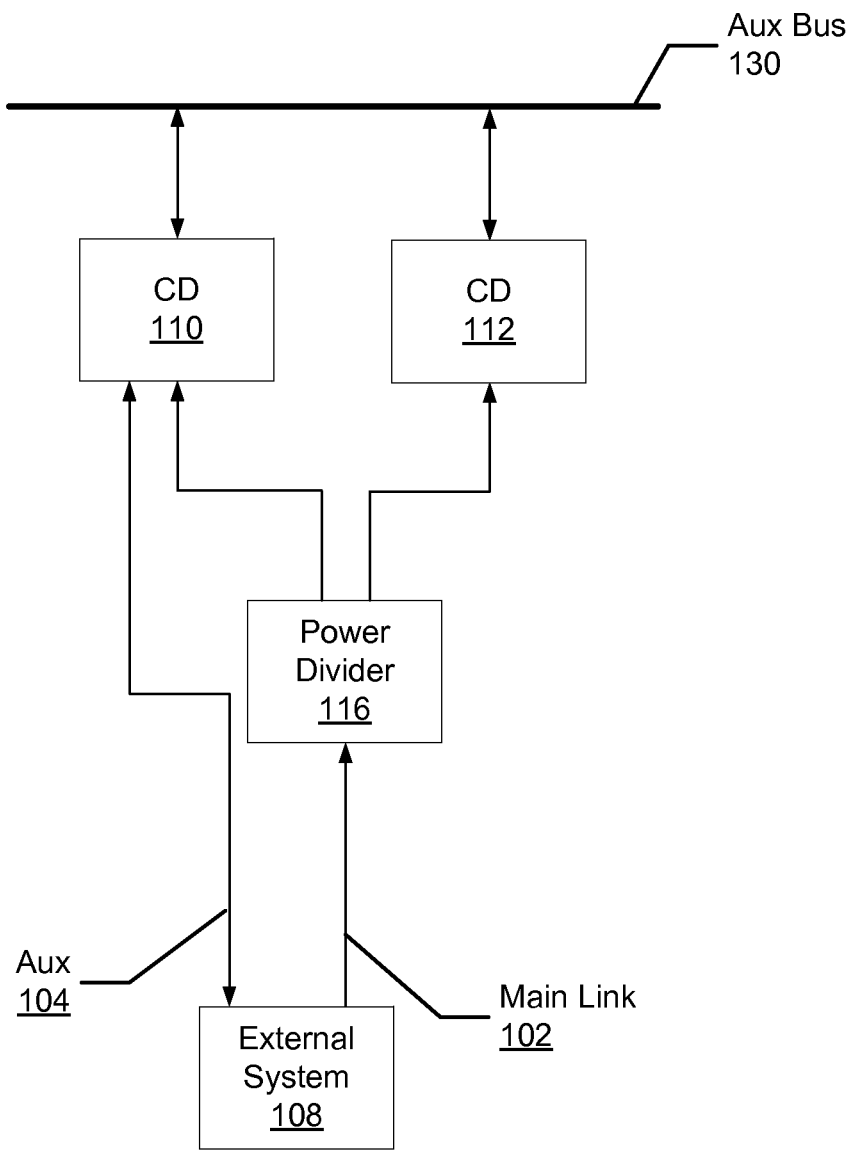
FIG. 1 illustrates one example embodiment of two column drivers with embedded TCONs.

Referring now to FIG. 1, illustrated is one example embodiment of illustrates one example embodiment of two column drivers with embedded TCONs. In one embodiment, the disclosed configuration is used with a DISPLAYPORT video input signal. The input signal includes a unidirectional main link 102 input and a bidirectional auxiliary (aux) 104 input. The display panel includes column driver 110, column driver 112, power divider 116 and auxiliary bus 130. In one embodiment, the main link 102 provides video information allowing a display panel to receive and display video. The aux 104 line allows communication between the display panel and an external system 108 outputting the video signal. This communication may include link training, status reports or other link establishing procedures. Link training may be used to establish and verify a connection between a column driver and another component or external system. In one embodiment, link training includes enabling a correct number of lanes at a proper link rate to support display of video. If synchronization is lost between a column driver and the external system, link training may be performed again.

The main link 102 is received by power divider 116. Power divider 116 distributes the main link 102 to each of the column drivers in the display panel, or in this case column driver 110 and column driver 112. The main link 102 signals distributed to each of the column drivers are near-identical signals. It should be noted that from a user's perspective, the display panel will use only a single input to receive a single video input as is typical, the signal may be split internally. The aux input 104 is received by column driver 110, which is designated as the master column driver. To allow communication between the external system 108 and non-master, or slave, column drivers, an auxiliary bus 130 is implemented. The auxiliary bus 130 allows the master column driver, column driver 110, to forward communications between the external system 108 and column driver 112. It should be noted that the system is expandable to include a plurality of column drivers. By utilizing the auxiliary bus 130, any number of column drivers can participate in link training, status report and other communications with the external system 108. Hence, point to point communication between the external system 108 and any of the column drivers is maintained. Slave column drivers can communicate with the external system 108 through the master column driver. In one embodiment, Inter-Integrated Circuit, or I²C, is used to facilitate communication between multiple column drivers over the auxiliary bus 130. Other communication protocols may be used to facilitate communication over the auxiliary bus 130. In one embodiment, each of the column drivers receives a signal on startup from a controller in the display panel designating whether it should use the auxiliary bus 130 as a master or a slave, though only a single column driver may be hardwired to receive auxiliary input 104 and serve as the master of the bus.

Figure 2:
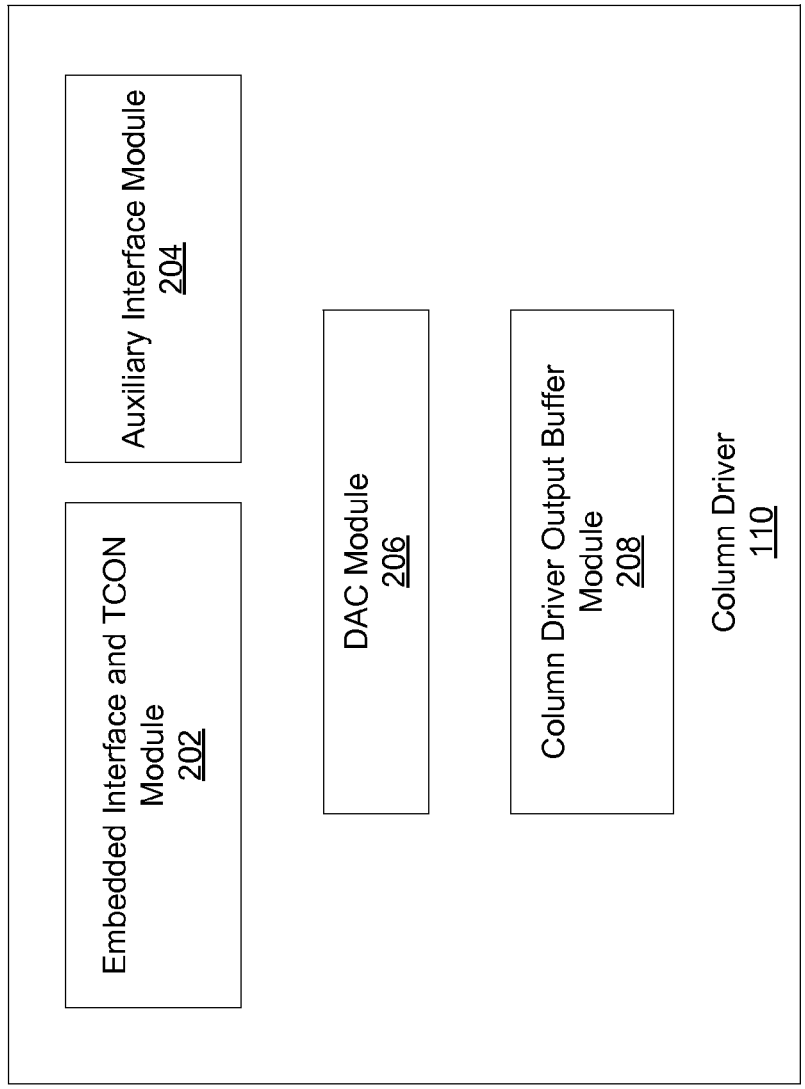
FIG. 2 illustrates a block diagram illustrating one example embodiment of a column driver utilizing an embedded TCON.

Turning next to FIG. 2, illustrated is a block diagram illustrating one example embodiment of a column driver utilizing an embedded TCON. Column driver 110 includes an embedded interface and TCON module 202, an auxiliary (aux) interface module 204, a digital-to-analog converter (DAC) module 206 and a column driver output buffer module 208. As previously discussed, embedded interface and TCON module 202 serves to receive main link 102 and operate the column driver in accordance with the received main link 102 signal. Each column driver is designated as a master or a slave. In one embodiment, this designation is stored in the column driver 110. Alternatively, a signal may be received by the auxiliary interface module 204 designating the column driver as a master or slave. This would be particularly useful if more than one column driver is wired to receive aux link 104. If designated a master, the auxiliary interface module 204 receives data via the aux link 104 and forwards communications between other column drivers and the external system 108 over the auxiliary bus 130. If a message on the aux link 104 is designated for column driver 110, auxiliary interface module replies to the message rather than forwarding to another column driver. The DAC module 206 processes information received by the embedded interface and TCON module 202 and the aux interface module 204 and prepares analog data that will be output by the column driver. Finally, a column driver output buffer module 208 buffers the output of the column driver 110 and proceeds with producing the desired image.

Figure 3:
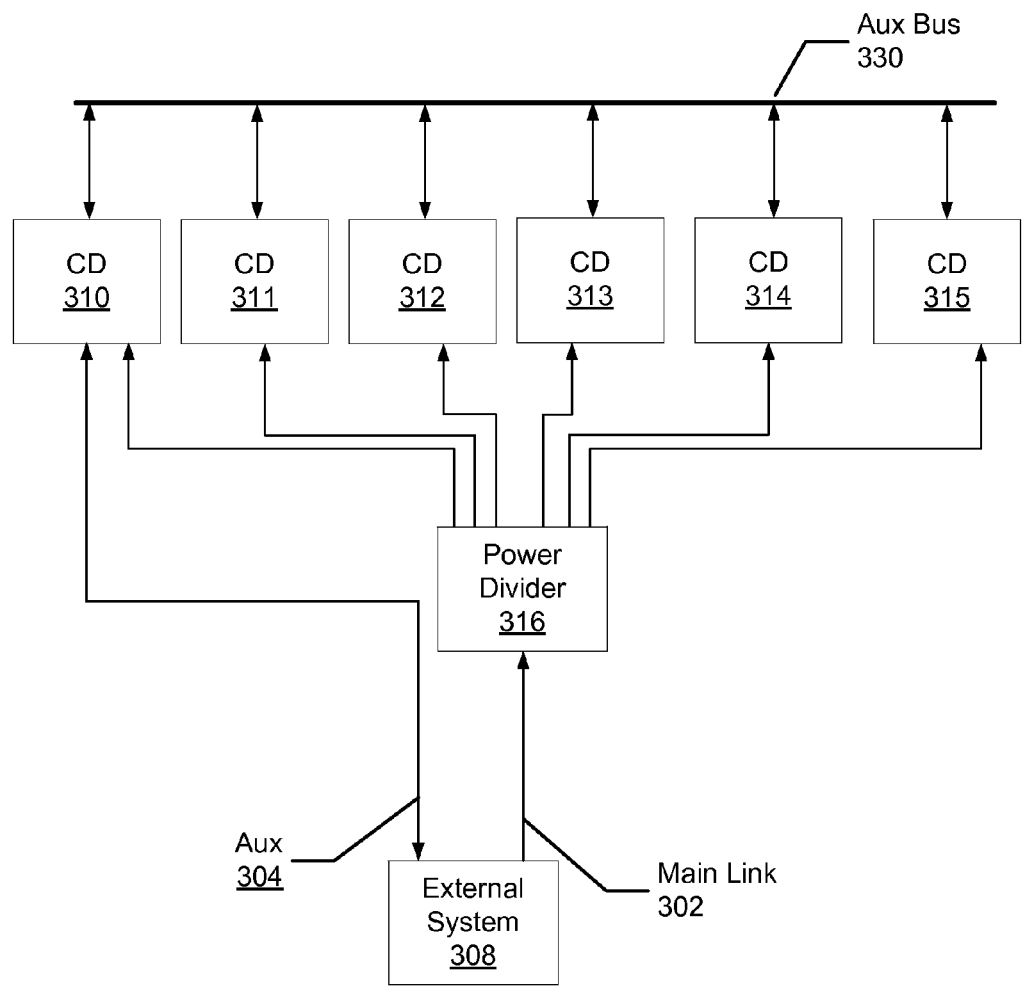
FIG. 3 illustrates one example embodiment of six column drivers each with an embedded TCON.

FIG. 3 illustrates one example embodiment of six column drivers each with an embedded TCON. The system illustrated in FIG. 3 is similar to the figure illustrated in FIG. 1, but explicitly illustrates the expandability of the disclosed system and method.

The display panel includes column drivers 310-315, power divider 316 and auxiliary bus 330. In one embodiment, the main link 302 provides a video signal allowing a display panel to receive and display video. The main link 302 is received by power divider 316. Power divider 316 distributes the main link 302 to each of the column drivers in the display panel. The aux 304 line allows communication between the display panel and an external system 308 outputting the video signal. This communication may include link training, status reports or other link establishing procedures. This communication may be designated for a certain column driver.

The aux input 304 is received by column driver 310, which is designated as the master column driver. To allow communication between the external system 308 and non-master, or slave, column drivers, an auxiliary bus 330 is implemented. The auxiliary bus 330 allows the master column driver, column driver 310, to respond to or forward communications between the external system 308 and column drivers 311, 312, 313, 314 and 315. It should be noted that any number of column drivers can utilize auxiliary bus 330. By utilizing the auxiliary bus 330, any number of column drivers can participate in link training, status report and other communications with the external system 308. In one embodiment, each of the column drivers receives a signal on startup from a controller in the display panel designating whether it should use the auxiliary bus 330 as a master or a slave. This may be particularly useful in a situation where multiple column drivers are wired to receive data from the aux 304 line.

Figure 4:
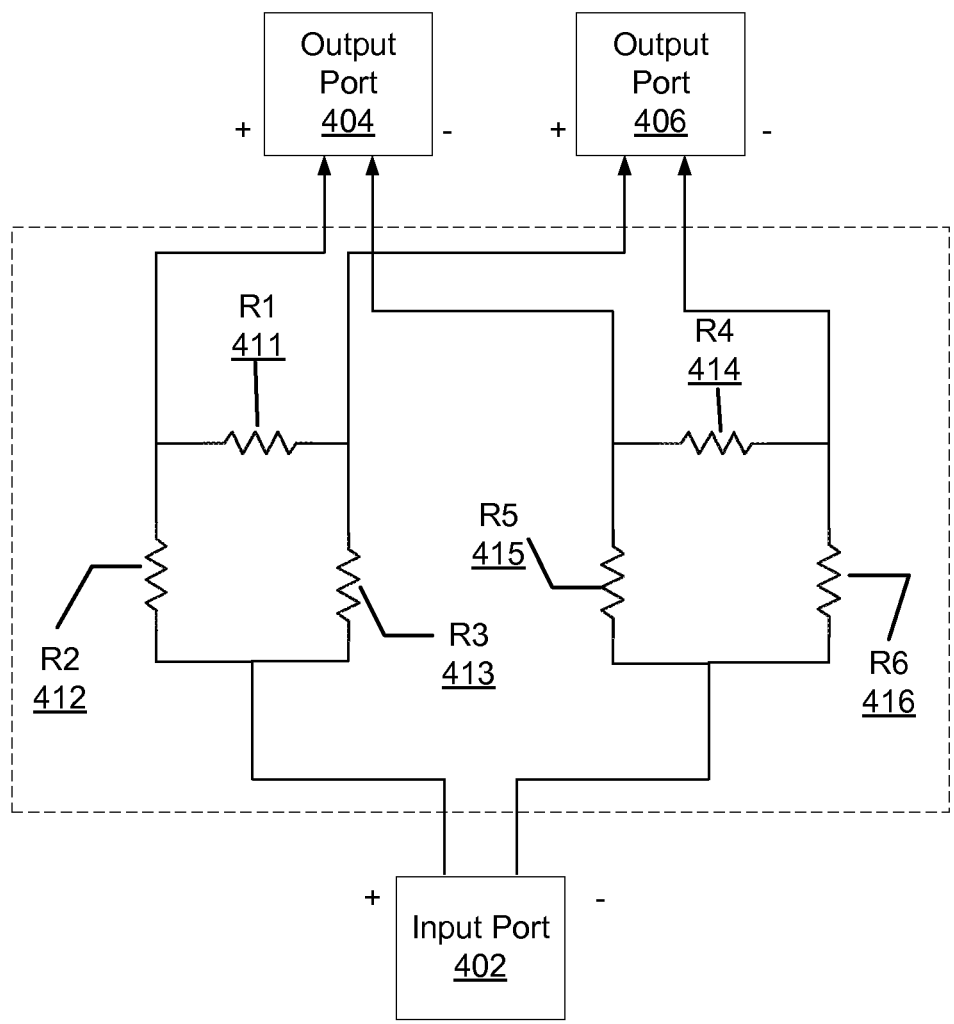
FIG. 4 illustrates one example embodiment of a power divider used in a system with embedded TCONs.

FIG. 4 illustrates one example embodiment of a power divider used in a system with embedded TCONs. Input port 402 receives a signal, such as video main link 102 and splits the signal. The signal is passed through a network of resistors R1 411, R2 412, and R3 413 in order to reproduce the signal at output port 404. Similarly, the signal is passed through a network of resistors R4 414, R5 415 and R6 416 to reproduce the signal at output port 406. A similar process can be used for additional output ports when additional output parts are called for. In this manner, the main link 102 signal is transmitted to any number of column drivers present in a display panel. This is only one example method for distributing the main link 102 to multiple column drivers. Other methods may be used as are well known in the art.

The system and method described above enable mitigating the space and power consumption used in implementing TCON functionality for multiple column drivers. The video data is split and transmitted to each of the column drivers. An auxiliary link is used for communication between an external system and a master column driver. The master column driver responds to or forwards communications between the external system and column driver. Hence, each column driver is able to function independently utilizing an embedded TCON as described.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method for embedding a timing controller on multiple column drivers through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for displaying a video signal, the system comprising:
   a power divider:
      having an input coupled to receive a video signal from an external system using a main link, and having a plurality of outputs to distribute the video signal to each of a plurality of column drivers, the video signal including video display information; and
   a column driver of the plurality of column drivers having an input coupled to receive the distributed video signal from one output of the plurality of outputs of the power divider, the column driver comprising:
      a timing controller interface module coupled to receive the distributed video signal from the power divider and configured to generate one or more control signals to control the operation of at least on column driver of the plurality of column drivers based on the video display information, and
      an auxiliary module having an input coupled to receive an auxiliary signal from the external system and configured to determine if the column driver is a destination column driver of the plurality column drivers based on the auxiliary signal, and having an output coupled to send the auxiliary signal to an input of an additional column driver of the plurality of column drivers, using an auxiliary bus, responsive to a determination that the column driver is not the destination column driver.

2. The system of claim 1, wherein the auxiliary module receives a response from the destination column driver and transmits the response to the external system.

3. The system of claim 2, wherein the auxiliary bus is communicatively coupled to the plurality of column drivers.

4. The system of claim 1, wherein the auxiliary bus uses a bi-directional communication protocol.

5. The system of claim 1, wherein the video signal is unidirectional.

6. The system of claim 1, wherein the auxiliary signal includes link training information.

7. The system of claim 1, wherein the power divider comprises a resistive network coupled between the input and the plurality of outputs of the power divider, the resistive network configured to distribute the received video signal to the plurality of outputs of the power divider.

8. The system of claim 1, wherein each column driver is coupled to the power divider using a separate link.

9. The system of claim 1, wherein the power divider is coupled to receive the video signal from the external system using a single link.

10. The system of claim 1, wherein the column driver operates as a master column driver and the additional column driver operates as a slave column driver with respect to the auxiliary bus.

11. A method for displaying a video signal, the method comprising:
   receiving, by a power divider, a video signal from an external system, the video signal including video display information;
   distributing, using the divider, the received video signal to a plurality of column drivers;
   receiving, by an auxiliary module included in a column driver of the plurality of column drivers, an auxiliary signal from the external system;

determining whether the column driver is a destination column driver of the plurality of column drivers based on the auxiliary signal; and transmitting the auxiliary signal to the destination column driver over an auxiliary bus, responsive to a determination that the column driver is not the destination column driver.

12. The method of claim 11, further comprising:

receiving a response from the destination column driver and transmitting the response to the external system.

13. The method of claim 12, wherein the auxiliary bus is communicatively coupled to the plurality of column drivers.

14. The method of claim 11, wherein the auxiliary bus uses a bi-directional communication protocol.

15. The method of claim 11, wherein the video signal is unidirectional.

16. The method of claim 11, further comprising:

processing the video signal and operating the plurality of column drivers.

17. The method of claim 11, wherein the auxiliary signal includes link training information.

18. A computer program product for video signal processing, the computer program product comprising a non-transitory computer-readable storage medium storing instructions that when executed cause at least one processor to:

receive, by a power divider, a video signal from an external system, the video signal including video display information;

distribute, using the power divider, the received video signal to a plurality of column drivers;

receive, by an auxiliary module included in a column driver of the plurality of column drivers, an auxiliary signal from the external system;

determine whether the column driver is a destination column driver of the plurality of column drivers based on the auxiliary signal; and transmit the auxiliary signal to the destination column driver over an auxiliary bus, responsive to a determination that the column driver is not the destination column driver.

19. The computer program product of claim 18, further comprising:

receive a response from the destination column driver and transmit the response to the external system.

20. The computer program product of claim 19, wherein the auxiliary bus is communicatively coupled to the plurality of column drivers.

21. The computer program product of claim 18, wherein the auxiliary bus uses a bi-directional communication protocol.

22. The computer program product of claim 18, wherein the video signal is unidirectional.

23. The computer program product of claim 18, wherein the computer-readable storage medium further has instructions that when executed cause the at least one processor to:

process the video signal and operate the plurality of column drivers.

24. The computer program product of claim 18, wherein the auxiliary signal includes link training information.

* * * * *